US008826285B2

United States Patent
Beltrand

(10) Patent No.: US 8,826,285 B2
(45) Date of Patent: Sep. 2, 2014

(54) METHOD AND DEVICE FOR ENCAPSULATING APPLICATIONS IN A COMPUTER SYSTEM FOR AN AIRCRAFT

(75) Inventor: Francois Beltrand, Villeneuve Tolosane (FR)

(73) Assignee: Airbus Operations, Toulouse (FR)

( * ) Notice: Subject to any disclaimer, the term of this patent is extended or adjusted under 35 U.S.C. 154(b) by 747 days.

(21) Appl. No.: 12/541,381

(22) Filed: Aug. 14, 2009

(65) Prior Publication Data
US 2010/0100887 A1   Apr. 22, 2010

(30) Foreign Application Priority Data
Sep. 15, 2008   (FR) ...................................... 08 56193

(51) Int. Cl.
G06F 9/46   (2006.01)

(52) U.S. Cl.
USPC .......................................... 718/103; 718/105

(58) Field of Classification Search
None
See application file for complete search history.

(56) References Cited

U.S. PATENT DOCUMENTS

| 5,522,026 | A | * | 5/1996 | Records et al. ................ 715/710 |
| 6,457,142 | B1 | * | 9/2002 | Klemm et al. ............. 714/38.12 |
| 7,461,299 | B2 | * | 12/2008 | Rothman et al. ................ 714/42 |
| 2002/0144010 | A1 | * | 10/2002 | Younis et al. ................. 709/314 |
| 2003/0079154 | A1 | * | 4/2003 | Park et al. .......................... 714/1 |
| 2003/0217088 | A1 | | 11/2003 | Takamoto |
| 2007/0038885 | A1 | * | 2/2007 | Hartung ............................ 714/4 |
| 2007/0115938 | A1 | * | 5/2007 | Conzachi et al. ............. 370/352 |

FOREIGN PATENT DOCUMENTS

WO   WO 01/86442 A2   11/2001

OTHER PUBLICATIONS

Norman Feske et al., "A Nitpicker's guide to a minimal-complexity secure GUI", Proceedings of $21^{st}$ Annual Computer Security Applications Conference, Dec. 5, 2005, XP-002513848, 10 pages.

* cited by examiner

Primary Examiner — Meng An
Assistant Examiner — Wissam Rashid
(74) Attorney, Agent, or Firm — Oblon, Spivak, McClelland, Maier & Neustadt, L.L.P.

(57) ABSTRACT

The object of the invention is in particular a device for execution of applications (510) in an aircraft information-processing system (500), permitting the simultaneous execution of at least two distinct applications, the said information-processing system comprising shared calculation and storage resources. The device comprises software segregation means capable of creating at least two distinct information-processing environments (505), a partition of the said calculation and storage resources being allocated to each of the said at least two environments in such a way that the execution of one of the said at least two applications in one of the said at least two environments does not have any effect on the execution of the other of the said at least two applications executed in the other of the said at least two environments. Another object of the invention is a method for employing such a device.

7 Claims, 4 Drawing Sheets

METHOD AND DEVICE FOR ENCAPSULATING APPLICATIONS IN A COMPUTER SYSTEM FOR AN AIRCRAFT

The present invention relates to on-board software applications in the computers of aircraft and more particularly to a method and a device for encapsulating applications in an information-processing system for aircraft, which system permits segregation of applications.

In general, modern aircraft comprise on-board information-processing systems for the purpose in particular of functions related to avionics, such as navigation. For security reasons, these applications, generally programmed in languages such as assembler or C, are certified. In addition, data exchange between these applications and other systems, such as ground systems, is protected.

To meet increasing needs such as optimization of maintenance operations and of the operation of aircraft, however, specific applications, which do not interfere directly with the piloting of aircraft, have been developed. Nevertheless, such applications are generally implemented in separate systems of the avionics, in such a way that a fault of these applications does not have any consequence for the safety of the aircraft. These systems are known as open systems, since they permit the airline companies operating the aircraft to install their own applications, which may be applications of the Java type (Java is a trademark) or web type of the IT world (initials for Information Technology in English terminology).

Figure 1:
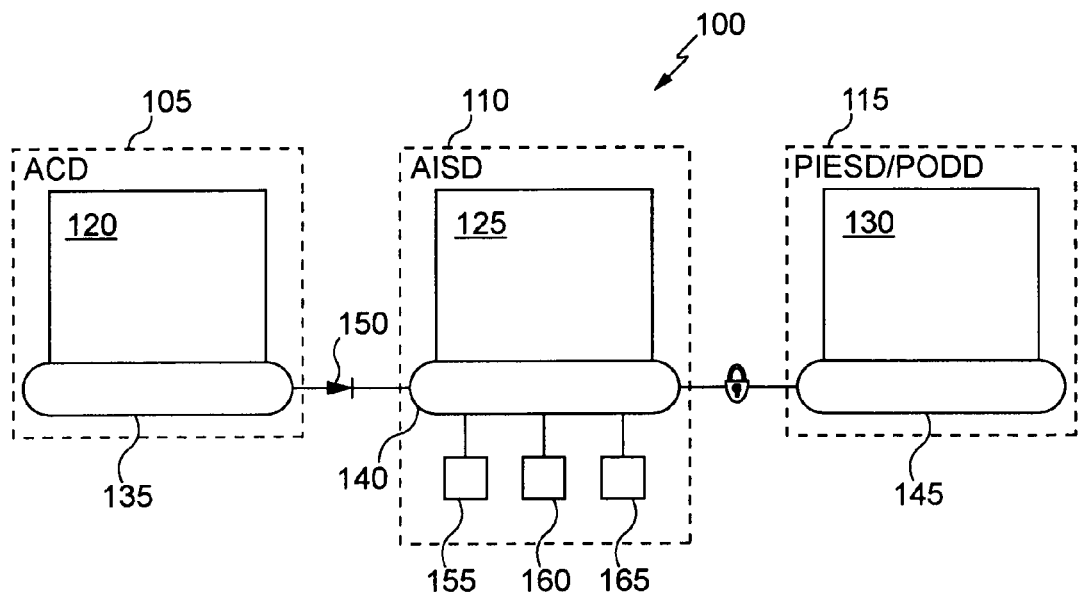

FIG. 1 schematically illustrates an example of information-processing architecture that can be employed in an aircraft. As illustrated, architecture 100 in this case comprises an avionic domain 105, known as Aircraft Control Domain (ACD) in English terminology, a services domain 110 of the airline company, known as Airline Information Service Domain (AISD) in English terminology, and a passenger domain 115, comprising domains known as Passenger Information and Entertainment Service Domain (PIESD) and Passenger Owned Devices Domain (PODD) in English terminology.

Each domain 105, 110 and 115 comprises information-processing systems 120, 125 and 130 respectively, composed, for example, of one or more computers or servers.

Avionics domain 105 comprises closed network 135, while airline company services domain 110, referred to as company service domain in the rest of the description, and passenger domain 115 comprise private network 140 and public network 145 respectively. Closed network 135 and private network 140 are connected by a diode 150, in such a way that data can be transmitted from closed network 135 to private network 140, but data cannot be transmitted from private network 140 to closed network 135. Furthermore, there exists a secured bridge between private network 140 and public network 145 to permit data exchange between these networks, subject to authorization.

Printer device 155, communication device 160 and display device 165, belonging to company service domain 110, are in this case connected to private network 140.

Company service domain 110 permits especially the airline company operating the aircraft to exchange data with this aircraft. Such data are, for example, maintenance data transmitted by the aircraft to its airline company to permit the company to plan maintenance operations even while the aircraft is in flight. These data may also pertain to instructions or weather reports transmitted by the airline company to the aircraft.

The applications employed in company service domain 110 are often obtained from the open world, meaning that they are based on code elements that have not necessarily been checked and that are therefore potentially subject to faults. Such faults may lead to unavailability of the application in question, to disruption of other applications of the company service domain and/or to a fault of the domain itself.

To alleviate such situations, the company service domain is usually based on a redundant system comprising two computers known as SPUs (initials for Server Process Unit in English terminology). However, although this solution makes it possible to improve the reliability of the company service domain, its efficacy is limited, especially when a fault of an application results in disruption of other applications.

The invention makes it possible to solve at least one of the problems described in the foregoing.

The object of the invention is therefore a device for execution of applications in an aircraft information-processing system, permitting the simultaneous execution of at least two distinct applications, the said information-processing system comprising shared calculation and storage resources, this device comprising software segregation means capable of creating at least two distinct information-processing environments, a partition of the said calculation and storage resources being allocated to each of the said at least two environments in such a way that the execution of one of the said at least two applications in one of the said at least two environments is independent of the execution of the other of the said at least two applications executed in the other of the said at least two environments.

The device according to the invention therefore makes it possible to segregate the applications executed in an aircraft information-processing system, especially in what is known as an open information-processing system, to limit the effects of a fault of one application upon another application.

Advantageously, the device additionally comprises control means capable of detecting a fault of the said information-processing system, of at least one of the said at least two environments and/or of at least one of the said at least two applications. In this way the device according to the invention is capable of monitoring the execution of applications and, when a fault is detected, of deciding what can be done appropriately in response to this fault, for example re-initializing or re-launching the faulty application. In this way the said control means are preferably capable of stopping and launching each of the said at least two applications. Similarly, the said control means are preferably capable of stopping and employing each of the said at least two environments in order to re-initialize one or both environments.

According to a particular embodiment, the said control means additionally comprise means for exchanging data with equivalent control means of an information-processing system, known as the second information-processing system, distinct from the said information-processing system, known as the first information-processing system, in order to employ at least one environment of the second information-processing system and to execute at least one application of the said second information-processing system.

In this way the device according to the invention makes it possible in particular to employ a degraded mode of operation when a fault disrupts the operation of a second information-processing system, in order to permit one or more applications executed on this information-processing system to be executed on the first information-processing system.

Advantageously, the device additionally comprises means for detecting the fault of the said second information-processing system and means for managing the priority of applications capable of configuring the said first information-processing system when a fault is detected in the said second information-processing system, in such a way that the applications having the highest priority levels of the said first and second information-processing systems are executed in the said first information-processing system.

According to a particular embodiment, the device additionally comprises means for displaying data originating from one of the said at least two applications, the said means for displaying data comprising a graphical software of the client type capable of transmitting display requests. In this way, the device according to the invention makes it possible to reroute the display of information items relating to the executed applications.

According to another particular embodiment, the device additionally comprises communication means, the said communication means being shared between the said at least two environments to permit reception or transmission from or to a device external to the said aircraft.

Advantageously, each of the said at least two environments uses its own operating system.

Another object of the invention is a method for employing the device described in the foregoing.

Figure 2:
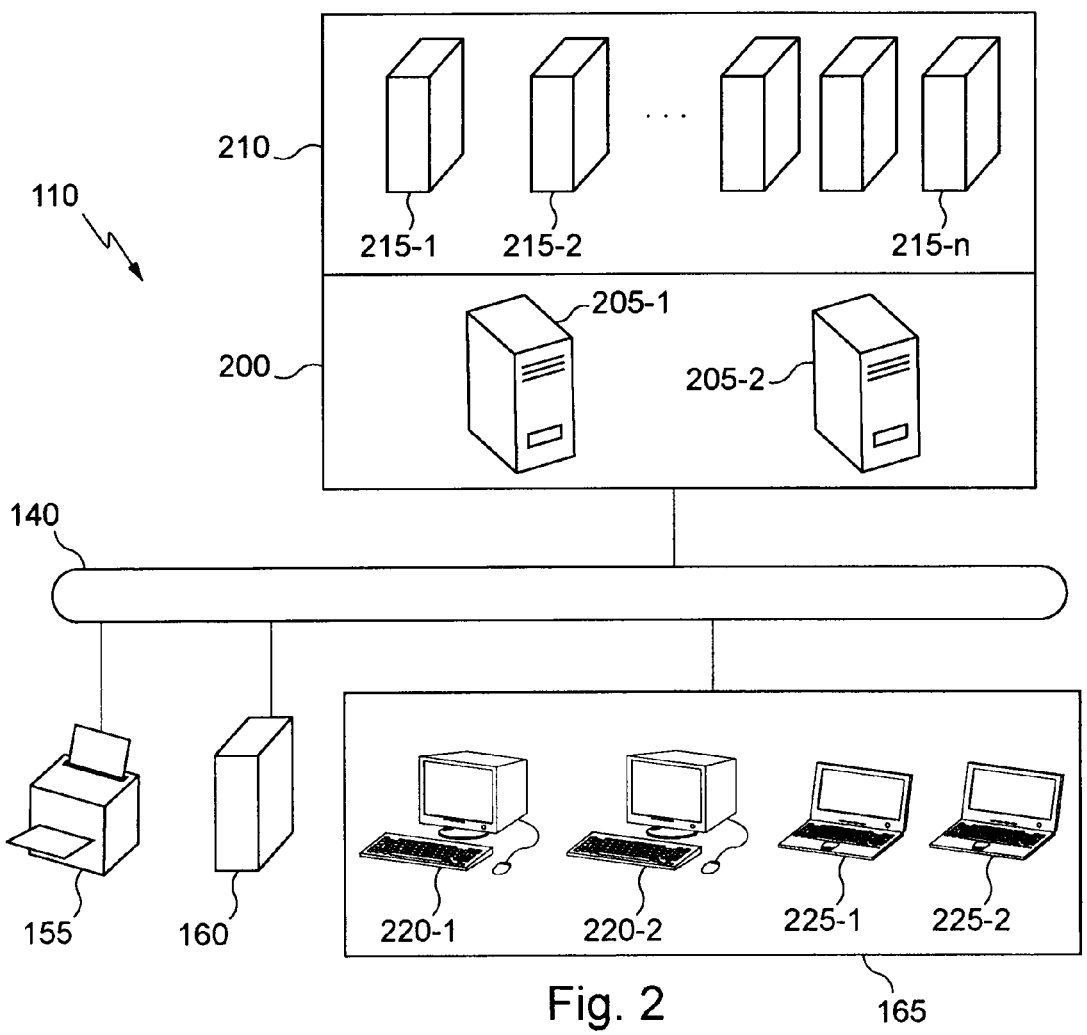
Figure 3:
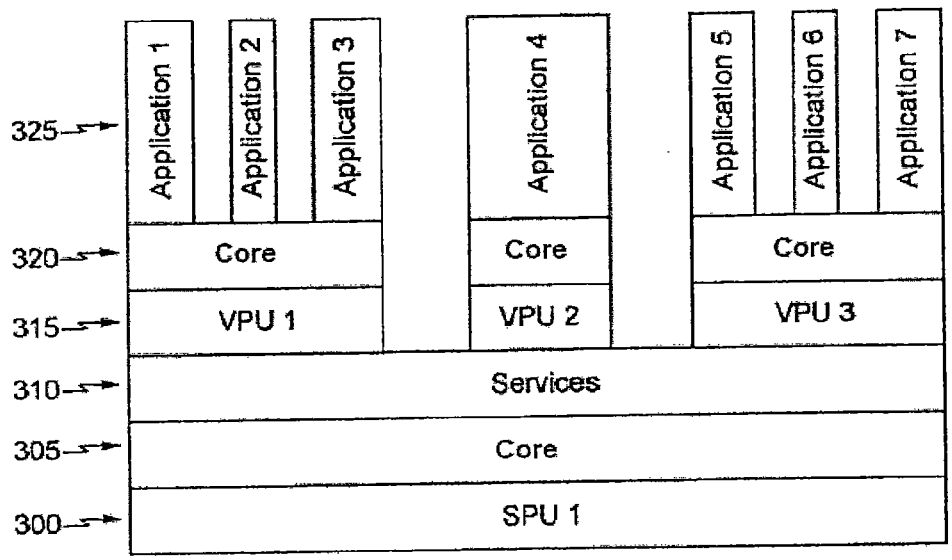
Figure 4:
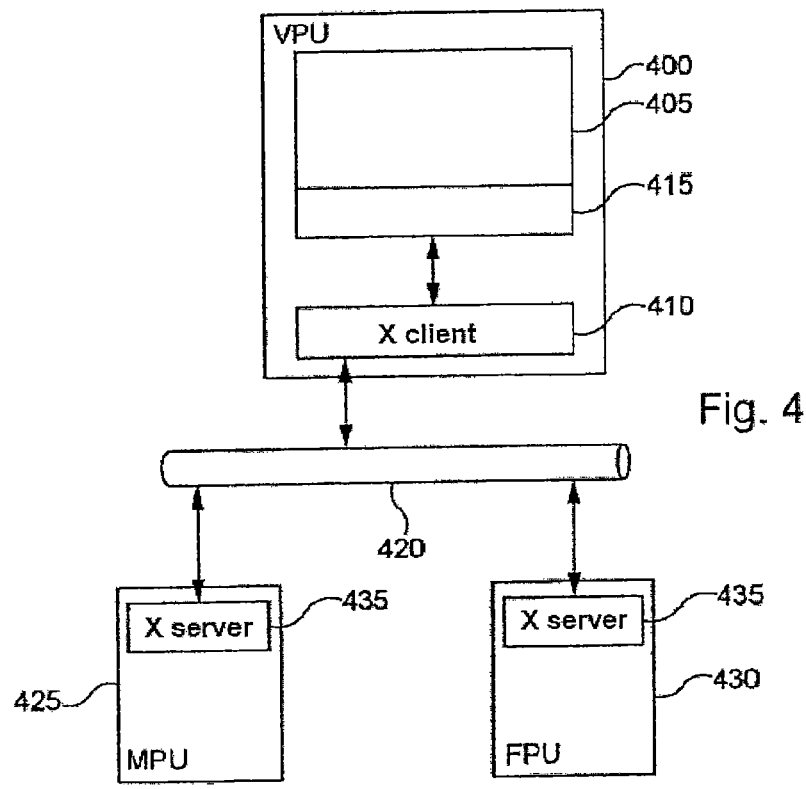
Figure 5:
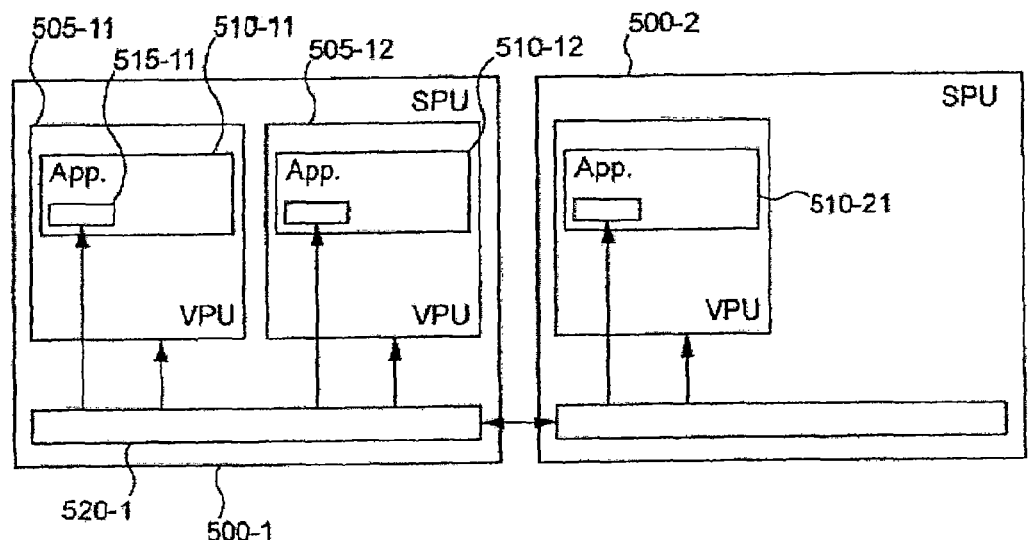
Figure 6:
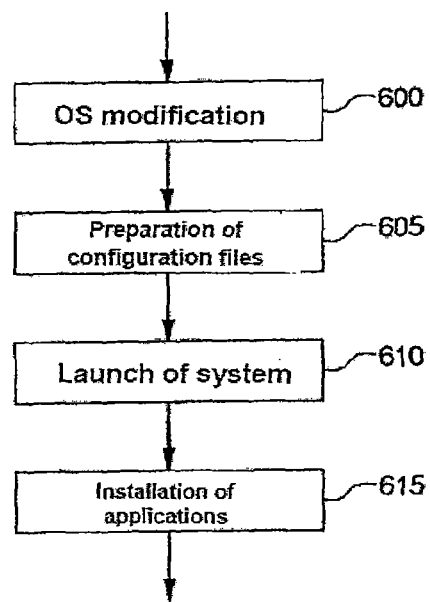
Figure 7:
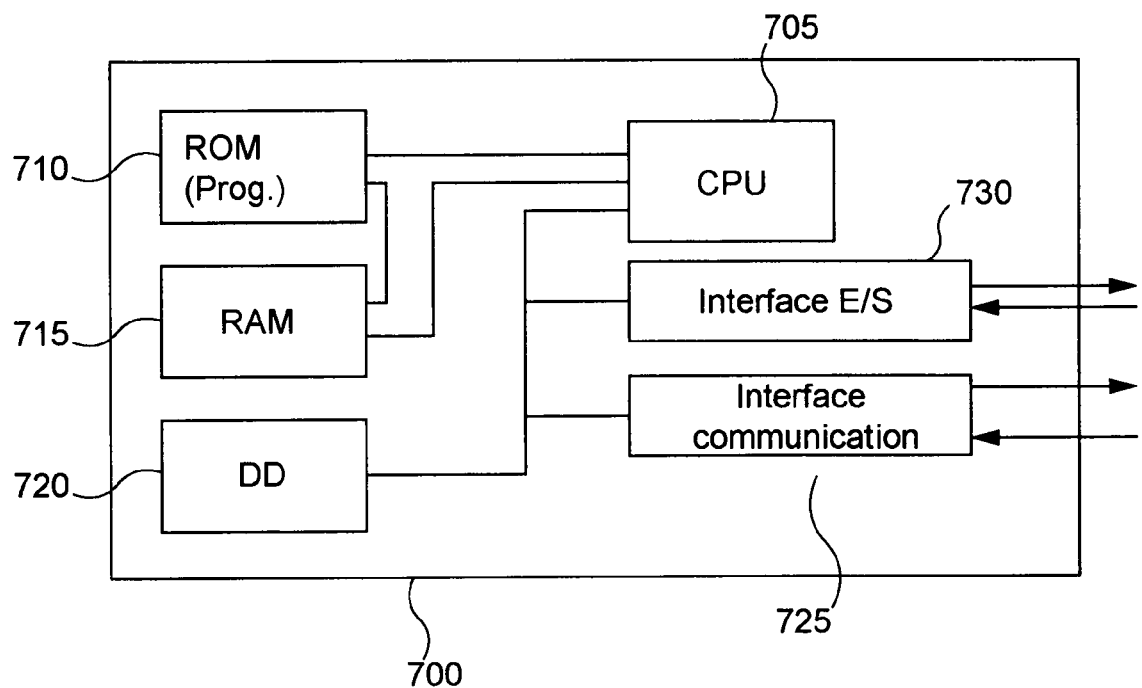

Other advantages, objectives and characteristics of the present invention become apparent from the detailed description hereinafter, provided by way of non-limitative example, with reference to the attached drawings, wherein:

FIG. 1 schematically shows an example of information-processing architecture that can be employed in an aircraft;

FIG. 2 schematically illustrates an example of information-processing architecture of an airline company services domain in an aircraft, according to the invention;

FIG. 3 presents the stacking of software layers on the hardware layer of an SPU of the airline company services domain;

FIG. 4 illustrates an example of software architecture offering graphical display functions to the applications executed in VPUs;

FIG. 5 schematically illustrates the role of software services controllers for aiding in the administration of SPUs, VPUs and applications;

FIG. 6 presents certain steps of an example of the method for employing the invention; and FIG. 7 illustrates an example of physical architecture of an SPU.

In general, the object of the invention is an information-processing architecture of an airline company services domain in an aircraft, permitting the segregation of applications executed therein. The segregation in this case is achieved by means of software according to a virtualization mechanism with the aid, for example, of the Xen application developed by the University of Cambridge in the United Kingdom.

A virtualization mechanism makes it possible to create several virtual machines on the basis of one or more real machines. Each virtual machine uses its own operating system. The software layer offering the virtualization mechanism, known in general as a hypervisor, can be integrated into the operating system of the real machine or implemented in the form of an additional layer.

The hypervisor is responsible for sharing the resources of the real machine and for application of rules for control of access to the resources. The resources shared between the virtual machines are, for example, the calculating power of the CPU (initials for Central Processing Unit in English terminology), the communication channels, the hardware and software interrupts, the input/output ports, the memory, the clocks, the bus systems, the controllers and/or the mass storage memory.

FIG. 2 schematically illustrates an example of information-processing architecture of an airline company services domain 110 in an aircraft, according to the invention. Airline company services domain 110, referred to as company service domain, comprises a physical infrastructure 200 based in this case on two computers 205-1 and 205-2 of SPU type. SPU 205-1 and 205-2 are redundant, meaning that the same applications can be executed on each of them, one being primary, the other secondary. Nevertheless, it should be noted that employment of the invention is not limited by the number of computers.

Each SPU is capable in this case of supporting containers 215-1 to 215-$n$, or in other words logical entities comprising an execution environment, an operating system and applications. The execution environment corresponds substantially to communication means, to input/output interfaces, to the memory and to a calculating power. The containers, also known as VPUs (initials for Virtual Process Unit in English terminology), are independent of one another, so that if a fault affects one of them or an application executed in one of them, the others are not disrupted.

Physical infrastructure 200 is connected to private network 140, to which there are also connected a printer 155, a communication interface 160, such as a satellite communication interface and display devices 165. The display devices in this case are fixed or mobile, for example of the FPU and MPU type (initials for Fixed Process Unit and Mobile Process Unit in English terminology). Although only two FPUs 220-1 and 220-2 as well as two MPUs 225-1 and 225-2 are shown, these numbers are not limitative.

The FPUs and the MPUs can be considered in this case as microcomputers of the PC type (initials for Personal Computer in English terminology). However, the data originating from applications executed in the SPUs can also be displayed on a simple screen connected to the SPUs, either directly or via a switch for switching the data source between the SPUs and other sources.

The VPU concept makes it possible to offer the developers virtual systems forming environments in which the applications can be developed, tested and executed in such a way that these applications are not disrupted by the execution of other applications.

Each VPU preferably has a network address specific to it. However, since network segregation cannot be proposed in an environment of Ethernet type, it is appropriate to employ service quality functions, known as quality of service in English terminology, to access the network resources.

The installation of applications in each VPU is preferably achieved in conformity with the ARINC 665 standard.

FIG. 3 illustrates more precisely the stacking of the software layers on the hardware layer of an SPU of a company service domain.

Layer 300 in this case represents the hardware layer of an SPU, referred to as SPU 1. The hardware layer comprises, for example, a microprocessor, memory (read-only memory, working memory and mass storage memory), an input/output interface of keyboard type, a network interface. FIG. 7 illustrates an example of hardware layer 300.

Above hardware layer 300 there is found a first software layer 305 forming the software core of the SPU. This layer comprises in particular the operating system of the SPU, the hardware drivers, as they are known in English terminology, as well as the network layer, permitting data exchange between the SPU and an external system.

Above layer 305 there is found the software services layer 310, or basic services layer, capable in particular of maintaining an activity journal (known as log in English terminology), of managing the parameters specific to the aircraft and used by the company service applications, and of exchanging data between these applications and/or between these applications and external systems. They are substantially basic services furnished to the applications.

Virtualization layer 315 makes it possible to create the containers (VPUs) for segregating in particular the calculating power of the SPU, its memory space and its mass storage memory. In this way the applications executed in one VPU are independent of applications executed in other VPUs.

Each VPU preferably employs an independent operating system (layer 320), making it possible to execute applications (325) in separate and independent manner. Each application executed in a VPU is able to access the services of the SPU (layer 310) via network and input/output interfaces. The interface used by the applications is preferably standard, for example of POSIX type (initials for Portable Operating System Interface for Unix in English terminology).

Graphical display functions such as GUIs (initials for Graphical User Interface in English terminology) can be employed by using, for example, the mechanism known as X11. According to this mechanism, using the client/server model, an X client transmits requests for display and for interaction of keyboard/mouse type on a software port to an X server by using the X protocol and an X library.

FIG. 4 illustrates an example of software architecture offering graphical display functions to the applications executed in the VPUs. VPU 400 in this case comprises several applications 405 capable of exchanging data with an X client 410 via a graphical interface 415. The SPU (not shown) employing VPU 400 is connected to private network 420, to which there are also connected MPU 425 and FPU 430, each comprising an X server 435 and 440 respectively. The graphical libraries employed in VPU 400, MPU 425 and FPU 430 are compatible (preferably the versions are the same).

In this way, when an application executed on VPU 400 transmits an interaction request to X server 435 or 440, a user of MPU 425 or of FPU 430 can interact with the application with the aid of a keyboard, mouse or equivalent device connected to MPU 425 or FPU 430. In response, X server 435 or 440 serves the request to X client 410 via graphical interface 415 by transmitting the commands of the user. In the same way, the application can transmit graphical data to MPU 425 or to FPU 430 via graphical interface 415, X client 410 and X server 435 or 440.

In this way, it is not necessary to develop specific code for MPU 425 and FPU 430.

A software services controller (layer 310) is used to monitor each SPU, especially to detect states in which the SPU, one or more VPUs and/or one or more applications are operating in degraded mode. This controller preferably offers the following functionalities, detection of the state of the SPU;
allocation, launch and stoppage of a VPU;
detection of the state of a VPU;
allocation, launch and stoppage of an application; and
detection of the state of an application.

FIG. 5 schematically illustrates the role of software services controllers contributing to the administration of two SPUs, of VPUs created in the SPUs and of applications executed in the created VPUs. The software services controllers also contribute to the administration of the roles of two redundantly operating SPUs, one being a primary SPU, the other a secondary, the primary having priority over the secondary.

Since SPUs 500-1 and 500-2 have similar architecture, only the architecture of SPU 500-1 is presented here.

SPU 500-1 comprises several VPUs, in this case VPUs 505-11 and 505-12, each VPU permitting the execution of one or more applications.

A control script or a control interface is preferably associated with each application to indicate the state of the application with which it is associated to the software service controller. For example, VPU 505-11 permits execution of application 510-11, with which there is associated control script or control interface 515-11.

Software service controller 520-1 of SPU 500-1 is connected to each of the VPUs that it employs, VPUs 505-11 and 505-12, as well as to each control script or control interface of the applications executed in these VPUs (especially control script or control interface 515-11).

In this way, software service controller 520-1 is capable of determining the state of SPU 500-1, of VPUs 505-11 and 505-12, as well as of applications executed in these VPUs.

Software service controller 520-1 of SPU 500-1 is additionally connected in this case to software service controller 520-2 of SPU 500-2 in order to permit reconfiguration of the VPUs and of the executed applications if a fault is detected in an SPU.

Such a reconfiguration may be employed, for example, on the basis of a state diagram. By way of illustration, if an SPU suffers a breakdown, the other SPU becomes the primary SPU (if it was the secondary). It stops and/or launches predetermined VPUs to execute the most important applications and to permit operation of the company service domain in degraded mode. The choice of VPUs and of applications of the degraded mode is predetermined; it can depend in particular on the type of fault and on certain external conditions, such as the phase of flight.

According to a particular embodiment, each software service controller uses a predetermined configuration file containing in particular information relating to a normal mode of operation, for which the VPUs are distributed in the SPUs, and to a degraded mode of operation, according to which one SPU is faulty and the activated VPUs are determined according to the priority of the executed applications.

When an SPU, for example the primary SPU, is faulty, the remaining SPU, or in other words the secondary SPU, changes roles and becomes the primary SPU. It stops the VPUs that it had been employing and that corresponded to applications of low priorities, in order to launch the VPUs previously employed on the faulty SPU, in charge of executing the applications having the highest priorities.

This management of VPUs is preferably transparent for the executed applications.

By way of illustration, if applications 510-12 and 510-21 have high priority, if application 510-11 has low priority and if SPU 500-2 is faulty, VPU 505-11 will be stopped and replaced by a VPU that permits application 510-21 to be executed in SPU 500-1.

Each SPU is advantageously provided with a backup partition, from which the operating system can be re-installed following a fault, or in order to update the system. The parameters of the VPUs and applications are preferably stored in a separate backup partition, in such a way that it is not necessary to re-install the VPUs and the applications after re-installation of the operating system of the SPU.

Configuration of the hypervisor in order to adapt the virtual machines to the needs of the executed applications can be achieved dynamically or statically by a mechanism for loading configuration data.

The employment of the invention can be subdivided into four distinct steps, as illustrated in FIG. 6.

A first step (step 600) has the purpose of modifying, adapting or installing an operating system on each SPU, to permit employment of VPUs. This step may consist, for example, in patching the operating system with the Xen application, or in other words in installing a modifying program on the installed operating system in order to extend the functions thereof.

A subsequent step (step 605) has the purpose of preparing the configuration files used in particular for defining the VPUs, by indicating, for each of them, the parameters necessary for their employment. These parameters are, for example, the calculating power, the amount of memory, the quality of network service and the number of ports.

These parameters may be determined in particular by calculations or by statistical analysis. They may be modified dynamically or statically.

Then, after the system has been launched (step 610), meaning that the SPUs have been started and the VPUs set in place, it is possible to install the applications that are to be executed (step 615). The applications are installed, for example, according to the ARINC 665 standard.

FIG. 7 illustrates an example of hardware architecture of an SPU 700, provided in this case with a communication bus, to which there are connected:

- a central processing unit or microprocessor 705;
- a read-only memory 710 (ROM, acronym for Read Only Memory in English terminology), that can comprise the programs to be executed ("Prog");
- a working memory 715 (RAM, acronym for Random Access Memory in English terminology), also known as random access memory or cache memory, comprising registers capable of recording the variables and parameters created and modified in the course of execution of the aforesaid programs;
- a mass storage memory 720, such as a hard disk, that can compromise the aforesaid programs "Prog" and data processed or to be processed according to the invention;
- a communication interface 725, capable of transmitting and receiving data; and,
- an input/output interface 730.

The communication bus permits communication and interoperability among the different elements included in device 700 or connected thereto. The depiction of the bus is not limitative and, in particular, the central unit is capable of communicating instructions to any element of device 700 directly or via another element of device 700.

The executable code of each program permitting the programmable device to employ the processes according to the invention may be stored, for example, on hard disk 720 or in read-only memory 710.

According to another variant, it will be possible for the executable code of the programs to be received at least partly via interface 725 to be stored in a manner identical to that described in the foregoing.

More generally, it will be possible for the program or programs to be loaded into one of the fixed or mobile storage means of device 700 before being executed.

Central unit 705 will command and direct the execution of the instructions or portions of software code of the program or programs according to the invention, which instructions are stored on hard disk 720 or in read-only memory 710 or else in the other aforesaid storage elements. During boot-up, the program or programs that is or are stored in a non-volatile memory, such as hard disk 720 or read-only memory 710, are transferred to random-access memory 715, which then contains the executable code of the program or programs according to the invention as well as registers for storing in memory the variables and parameters necessary for employment of the invention.

Naturally, to satisfy specific needs, an individual competent in the field of the invention will be able to apply modifications in the foregoing description.

The invention claimed is:

1. An information-processing system for execution of applications in an aircraft system that includes at least an avionics domain, which includes a closed network and includes functions related to piloting of the aircraft, and a services domain which includes a private network and includes applications installed by an airline company which do not interfere directly with the piloting of the aircraft, the information-processing system being part of the services domain and permitting execution of at least two distinct applications, the information-processing system comprising:
    shared calculation and storage resources;
    a software segregation unit that creates at least two distinct information-processing environments each having its own operating system and at least one of the two information-processing environments having a plurality of applications, a partition of the said calculation and storage resources being allocated to each of the at least two environments in such a way that the execution of one of the at least two applications in one of the at least two information-processing environments is independent of the execution of the other of the at least two applications executed in the other of the at least two environments;
    a fault detecting unit that detects a fault of at least one of the at least two information-processing environments and of at least one of the at least two applications;
    an exchanging unit that exchanges data with a second information-processing system, which is also in the services domain and is distinct from the information-processing system in order to employ at least one information-processing environment of the second information-processing system and to execute at least one application of the second information-processing system; and
    a managing unit configured to manage a priority of applications when a fault is detected in the second information-processing system, in such a way that the applications, in the services domain, having the highest priority levels of the information-processing system and the second information-processing system are executed in the information-processing system based on the type of fault and a phase of flight of the aircraft such that when a high-priority application exists on the second information-processing system and a low-priority application exists on the information processing environment, management of information processing environments is performed in which an information processing environment on the information-processing system which has the low-priority application is stopped and is replaced by an information-processing environment that permits the high-priority application of the second information-processing system to be executed, wherein the management of the information processing environments is transparent to any executed applications.

2. The information-processing system according to claim 1, further comprising a controller configured to stop and launch each of the at least two applications.

3. The information-processing system according to claim 1, further comprising a controller configured to stop and employ each of the at least two information-processing environments.

4. The information-processing system according to claim 1, wherein said managing unit manages the priority using a state diagram.

5. The information-processing system according to claim 1, additionally comprising a display unit configured to display data originating from one of the at least two applications, the display unit comprising a graphical software of the client type capable of transmitting display requests.

6. The information-processing system according to claim 1, additionally comprising a communication unit, the communication unit being shared between the at least two information-processing environments to permit reception or transmission from or to a device external to the aircraft.

7. A method implemented on an information-processing system for execution of applications in an aircraft system that includes at least an avionics domain, which includes a closed network and includes functions related to piloting of the aircraft, and a services domain which includes a private network and includes applications installed by an airline company which do not interfere directly with the piloting of the aircraft, the information-processing system being part of the services domain and permitting execution of at least two distinct applications, the method comprising:

creating, at a software segregation unit, at least two distinct information-processing environments each having its own operating system and at least one of the two information-processing environments having a plurality of applications, a partition of the shared calculation and storage resources of the system being allocated to each of the at least two environments in such a way that the execution of one of the at least two applications in one of the at least two information-processing environments is independent of the execution of the other of the at least two applications executed in the other of the at least two environments;

detecting, at a fault detecting unit, a fault of at least one of the at least two environments and of at least one of the at least two applications;

exchanging, at an exchanging unit, data with a second information-processing system, which is also in the services domain and is distinct from the information-processing system, in order to employ at least one information-processing environment of the second information-processing system and to execute at least one application of the second information-processing system; and managing, at a managing unit, a priority of applications when a fault is detected in the second information-processing system, in such a way that the applications, in the services domain, having the highest priority levels of the information-processing system and the second information-processing system are executed in the information-processing system based on the type of fault and a phase of flight of the aircraft, such that when a high-priority application exists on the second information-processing system and a low-priority application exists on the information processing environment, management of information processing environments is performed in which an information processing environment on the information-processing system which has the low-priority application is stopped and is replaced by an information-processing environment that permits the high-priority application of the second information-processing system to be executed, wherein the management of the information processing environments is transparent to any executed applications.

* * * * *